United States Patent [19]

Bronstert et al.

[11] Patent Number: 4,587,307

[45] Date of Patent: May 6, 1986

[54] QUALITY OF ISOBUTENE POLYMERS IN REACTIONS WITH MALEIC ANHYDRIDE

[75] Inventors: Klaus Bronstert, Carlsberg; Waldhelm Hochstein, Freinsheim; Hans-Henning Vogel, Frankenthal; Hans P. Rath, Gruenstadt, all of Fed. Rep. of Germany

[73] Assignee: BASF Aktiengesellschaft, Ludwigshafen, Fed. Rep. of Germany

[21] Appl. No.: 657,383

[22] Filed: Oct. 3, 1984

[30] Foreign Application Priority Data

Oct. 6, 1983 [DE] Fed. Rep. of Germany ....... 3336355

[51] Int. Cl.$^4$ ................................................ C08F 8/00
[52] U.S. Cl. ................................. 525/362; 525/333.7; 525/363
[58] Field of Search ................. 525/362, 363; 524/405, 524/430, 579

[56] References Cited

U.S. PATENT DOCUMENTS

| | | |
|---|---|---|
| 3,890,404 | 6/1975 | Takagi et al. ......................... 585/607 |
| 3,900,361 | 8/1975 | Hoppe et al. ......................... 524/430 |
| 3,943,093 | 3/1976 | Feniak ................................... 524/405 |
| 4,152,499 | 5/1979 | Boerzel et al. . |
| 4,254,294 | 3/1981 | Juguin et al. ......................... 585/525 |
| 4,285,751 | 8/1981 | Feinberg et al. ..................... 524/430 |
| 4,387,188 | 6/1983 | Statz ..................................... 524/430 |

Primary Examiner—Joseph L. Schofer
Assistant Examiner—Bernard Lipman
Attorney, Agent, or Firm—John H. Shurtleff

[57] ABSTRACT

The processing properties of isobutene polymers when reacted with maleic anhydride are improved by a method in which these polymers are brought into contact, for an effective period, with aluminum oxide and/or a completely or partially hydrated aluminum oxide at 50°–280° C., and/or with boron oxide and/or a completely or partially hydrated boron oxide and/or with titanium dioxide and/or a partially hydrated titanium dioxide and/or with a completely or partially hydrated silicon dioxide at 0°–280° C.

19 Claims, No Drawings

QUALITY OF ISOBUTENE POLYMERS IN REACTIONS WITH MALEIC ANHYDRIDE

The present invention relates to a process for improving the processing properties of isobutene polymers.

Homopolymers and oligomers of isobutene, and copolymers consisting predominantly of isobutene together with other olefinically unsaturated compounds which are copolymerizable with isobutene (also referred to below as polyisobutenes), are well known. The same applies to the preparation of polyisobutenes by cationic polymerization of isobutene in the presence or absence of other comonomers. In connection with the properties of the polyisobutenes in further reactions, the polymerization is advantageously carried out with boron trifluoride at from $-50°$ to $+30°$ C. in the course of not more than about 10 minutes, as recommended in, for example, U.S. Pat. No. 4,152,499.

It is also well known that the polyisobutenes are used principally for the preparation of high-grade additives to lubricating oils. For this purpose, they are first reacted, via the double bond still present in their molecule owing to chain termination, with maleic anhydride to give the corresponding long-chain derivatives of succinic anhydride, and the latter are then converted with amines, in particular polyamines, to the desired salts, amides or imides of succinic acid, which act as lubricating oil additives.

However, it has been found that the polyisobutenes, including those obtainable by the process described in U.S. Pat. No. 4,152,499, contain, as a rule, accompanying substances which are not known in detail and, when reacted with maleic anhydride, form residues which are deposited on the walls of the reaction vessels and hence give rise to technical problems and also result in a reduction in the quality of the lubricating oil additives.

It is an object of the present invention to remove the accompanying substances present in the polyisobutenes, or to change these substances so that they do not give rise to problems or result in a reduction in the quality of the lubricating oil additives.

We have found that this object is achieved by a process for improving the processing properties of isobutene polymers, wherein the latter are brought into contact, for an effective period, with aluminum oxide and/or a completely or partially hydrated aluminum oxide at $50°-280°$ C., and/or with boron oxide and/or a completely or partially hydrated boron oxide and/or wth titanium dioxide and/or a partially hydrated titanium dioxide and/or with a completely or partially hydrated silicon dioxide at $0°-280°$ C.

Particularly suitable isobutene polymers are the homopolymers and the copolymers containing a predominant amount of isobutene, in general not less than 80 mol %, these polymers being obtainable by the process described in said U.S. Pat. No. 4,152,499, by cationic homopolymerization or copolymerization using boron trifluoride as a catalyst, at from $-50°$ to $+30°$ C. for not more than 10 minutes. The amount of $BF_3$ is in general from 0.1 to 10 millimoles per mole of the monomers; furthermore, it is as a rule preferable if the polymerization is carried out in the presence of a cocatalyst, such as water or an alcohol, in a low concentration, for example from 2 to 200 mol %, based on the amount of $BF_3$.

Suitable comonomers are primarily the other olefinically unsaturated $C_4$ hydrocarbons, so that the $C_4$ cuts can be used directly as starting materials. However, because the isobutene undergoes substantially selective polymerization, comonomers are generally incorporated in the polymer as copolymerized units only in an amount of about 2-20 mol %, even when they are employed in excess.

For the purposes of the present invention, the term polyisobutenes also embraces the oligomers, including even the dimer.

Where $BF_3$ is used as the catalyst, the polymerization is terminated by, for example, heating at $40°-80°$ C. for a short time, during which the $BF_3$ escapes; in general, polymerization is terminated by adding water or an alcohol, such as methanol. Solid catalyst residues are filtered off or adsorbed onto an absorbent, such as aluminum oxide. In general, the catalysts can also be extracted with water, a base or methanol. Solvents and monomers are advantageously removed by flash distillation.

The polyisobutenes obtainable in this manner have molecular weights of 112 or higher, products having a mean molecular weight of about 500-5,000 being preferred. In general, these products possess a particularly high proportion of terminal double bonds, which are important for the subsequent reaction.

In other respects, however, the novel process is not restricted to polyisobutenes from a particular source.

The polybutene is freed in a conventional manner from the catalyst and from readily volatile constituents, and is after-treated according to the invention with aluminum oxide ($Al_2O_3$) and/or boron oxide ($B_2O_3$) and/or the completely or partially hydrated products of these oxides and/or titanium dioxide ($TiO_2$) or partially hydrated titanium dioxide and/or partially or completely hydrated silicon dioxide ($SiO_2$) ie. $Al_2O_3.(H_2O)_n$ and/or $B_2O_3.(H_2O)_n$ and/or $TiO_2.(H_2O)_{n-1}$ and/or $SiO_2 (H_2O)_{n-1}$ where n can have an integral or non-integral value up to 3, but should not be less than 1.5 in the case of $SiO_2$.

If n is 3, the compound in question is aluminum orthohydroxide, orthoboric acid, orthotitanic acid or orthosilicic acid. Smaller values of n correspond to mixed forms comprising the pure oxides and the pure hydroxides, eg. $HAlO_2$ (aluminum metahydroxide) and $HBO_2$ (metaboric acid). Many of these compounds can occur in various modifications, but observations to date have shown that the modification has only a minor effect on the success of the process. Furthermore, small amounts of by-products which frequently accompany the oxides or the hydrated oxides, eg. fluoride, chloride, alkali metals, alkaline earth metals and iron, have no detectable effect on the success of the process.

The mean particle diameter of the catalysts conforming to the definition is advantageously from 0.01 to 3, in particular from 0.1 to 1, mm.

The effective amount of the aluminum compounds naturally depends on their specific surface area and hence on the particle size and the treatment time. For a mean particle diameter of 0.5 mm and a contact time of 5 minutes in batchwise operation, this amount is about 10-12 g per kg of polyisobutene. If two of these parameters are predetermined in any case, a third can be obtained approximately on the basis of these, as can readily be determined more exactly in specific cases by a few preliminary experiments.

Since the boron compounds are in general the more active ones, only about 0.05-2 g of these compounds per kg of the polyisobutene are required for the treatment under the conditions stated above. The process is particularly advantageously carried out using catalysts which consist of Al compounds and are doped at the surface with about 1-10% by weight, based on the total catalyst, of one of the boron compounds.

The higher activity of the boron compounds permits the polyisobutene to be treated successfully at as low as about 0° C. In this case, and where boron-doped Al compounds are used, the procedure is therefore preferably carried out at room temperature.

Similar statements apply to the titanium compounds conforming to the definition as were made in the case of the boron compounds. An orthotitanic acid which can be obtained by hydrolysis of tetrabutyl orthotitanate is particularly suitable.

Among the silicon compounds, pure $SiO_2$ proved to be only slightly active, in contrast to the hydrated forms.

Because of the viscosity of the polyisobutenes, it may be preferable to carry out the treatment in the presence of about 5-70% by weight of a solvent. Particularly suitable solvents are aliphatic hydrocarbons, such as n-butene, n-butane and n-hexane. In the case of low-boiling solvents, the treatment should be carried out under an appropriate pressure (no higher than about 70 bar); otherwise, the procedure is preferably carried out under atmospheric pressure.

A particularly advantageous process comprises passing the polyisobutene or a solution thereof over a fixed-bed catalyst consisting of the material conforming to the definition, for example passing it under mechanical pressure through a filter bed.

The simplest method of determining the efficiency of the treatment, and the one which most closely resembles practice, is to react the treated polyisobutene with maleic anhydride. If this procedure is found to give no deposits on the walls of the reaction vessel, the treatment has been successful. Otherwise, harsher treatment conditions have to be employed and, if necessary, the catalyst also has to be changed.

EXAMPLE 1

Polyisobutene which had a mean molecular weight of 1,000 and had been prepared by polymerization of isobutene at 20° C. for 60 sec with the aid of 0.2 mol % of $BF_3$, and had been freed, in a conventional manner, from the catalyst, residual monomers and the oligomers having a degree of polymerization of up to about 6, was forced, at 200° C. and under superatmospheric pressure, through a charge of acidic $Al_2O_3$ having a mean particle size of 0.15 mm. The height of the charge was 10 cm and its cross-section was about 7 cm². A mean contact time of about 20 minutes was calculated from the flow rate of the polyisobutene, which was 1,000 ml/hour.

500 g of the polyisobutene treated in this manner were reacted with 50 g of maleic anhydride in a stainless steel autoclave at 225° C. for 4 hours. After the autoclave had been emptied, no residues were found. The conversion in this addition reaction was 55%, based on the maleic anhydride employed.

In a control experiment under the same conditions, but using polyisobutene which had not been pretreated, a dark residue was found on the walls of the autoclave and on the stirrer. This residue was taken up in dimethylformamide after the autoclave and the stirrer had been washed with toluene to remove the polyisobutene and its reaction products. The amount of residue remaining after the dimethylformamide had been evaporated off was 1.8 g.

In another control experiment, a 50 vol % solution of polyisobutene in hexane was passed through the $Al_2O_3$ charge at room temperature, under otherwise identical conditions. The subsequent reaction with maleic anhydride gave a product which contained just as much residue as when untreated polyisobutene was used.

EXAMPLE 2

1000 g portions of the polyisobutene described in Example 1 were heated with (a) 10 g of acidic $Al_2O_3$,
(b) 7.5 g of freshly precipitated $Al(OH)_3$,
(c) 0.05 g of $H_3BO_4$,
(d) 0.2 g of $B_2O_3$,
(e) 10 g of $H_2SiO_3$,
(f) 10 g of $TiO_2$ and
(g) 5 g of $Ti(OH)_4$, prepared by hydrolysis of $Ti(O-butyl)_4$ for 15 minutes at 200° C., after which the polyisobutene was filtered off from these materials.

When the polymers pretreated in this manner were each reacted with 100 g of maleic anhydride, a virtually residue-free polyisobutene/maleic anhydride adduct was obtained in each case.

We claim:

1. A process for improving the processing properties of an isobutene polymer so as to prevent deposits on the walls of a reaction vessel during reaction of said polymer with maleic anhydride, which process comprises:

treating said polymer at a temperature of about 0° to 280° C. by passage thereof, for an effective period of time sufficient to substantially prevent said deposits in the reaction of the polymer with maleic anhydride, over and in contact with at least one of the compounds selected from the group consisting of (a) aluminum oxide and/or a completely or partially hydrated aluminum oxide;
(b) boron oxide and/or a completely or partially hydrated boron oxide;
(c) titanium oxide and/or a completely or partially hydrated titanium oxide; and
(d) a completely or partially hydrated silicon dioxide, with the proviso that the treatment temperature is at least about 50° up to 280° C. when using only one or more of the aluminum compounds (a).

2. A process as claimed in claim 1, wherein one of the aluminum compounds which conforms to the definition and is doped with one of the boron compounds conforming to the definition is used at 0°-280° C.

3. A process as claimed in claim 1, wherein the polymer used consists of not less than 80 mol % of isobutene and is prepared by cationic polymerization at from −50° to +30° C. using boron trifluoride as the catalyst, the polymerization time being not more than 10 minutes.

4. A process as claimed in claim 1 wherein the polymer is contacted only with at least one of the aluminum compounds (a) at a temperature of about 50° to 280° C.

5. A process as claimed in claim 1 wherein the isobutene polymer consists essentially of polyisobutene containing double bonds capable of reaction with maleic anhydride.

6. A process as claimed in claim 1 wherein the isobutene polymer consists essentially of 80-98 mol % isobutene and 2–20 mol % of other olefinically unsaturated C4 hydrocarbons.

7. A process as claimed in claim 6 wherein said isobutene polymer has a molecular weight of about 500 to 5,000.

8. A process as claimed in claim 1 wherein said isobutene polymer is placed in a fluid form to pass over at least one of said compounds arranged in particulate form as a fixed bed.

9. A process as claimed in claim 8, using said compounds with a mean particle size of about 0.01 to 3 mm.

10. A process as claime in claim 8 using at least one of the boron compounds (b) in an amount of 0.05–2 grams per kg of the isobutene polymer being treated.

11. A process as claimed in claim 8 using at least one of the aluminum compounds (a) doped on the surface thereof with about 1–10% by weight of at least one of said boron compounds (b), based on the total weight of said compounds.

12. A process as claimed in claim 8 wherein the polymer is contacted only with at least one of said aluminum compounds (a) and the treatment is carried out at a temperature of 50° to 280° C.

13. A process as claimed in claim 8 wherein the treatment is carried out in the presence of a solvent for the isobutene polymer.

14. A process as claimed in claim 13 wherein the solvent is an aliphatic hydrocarbon.

15. A process as claimed in claim 14 wherein the solvent is selected from the group consisting of n-butene, n-butane and n-hexane.

16. A process as claimed in claim 8 using a particulate compound selected from the group consisting of:
acidic $Al_2O_3$;
a freshly precipitated $Al(OH)_3$;
$H_3BO_4$;
$B_2O_3$;
$H_2SiO_3$;
$TiO_2$; and
$Ti(OH)_4$ as prepared by hydrolysis of $Ti(O-butyl)_4$.

17. A process as claimed in claim 1 wherein said isobutene polymer is placed in a fluid form and passed at atmospheric or superatmospheric pressure over at least one of said compounds in particulate form and arranged as a fixed bed, using a mean particle size of about 0.1 to 1 mm.

18. A process as claime din claim 17 wherein the individual particles are composed of at least one of said aluminum compounds (a) doped on the surface thereof with at least one of said boron compounds (b).

19. A process as claimed in claim 18 wherein the amount of (b) is about 1–10% by weight with reference to the total amount of (a) and (b).

* * * * *